United States Patent [19]

Dulaney et al.

[11] 4,294,619

[45] Oct. 13, 1981

[54] METHOD OF PRODUCING PIGMENTED SILICATE COATINGS

[75] Inventors: Donald C. Dulaney, Gurnee; John A. Bowman, Wheeling, both of Ill.

[73] Assignee: Rust-Oleum Corporation, Vernon Hills, Ill.

[21] Appl. No.: 136,322

[22] Filed: Apr. 1, 1980

[51] Int. Cl.[3] .......................... C09D 5/04; C09D 5/08; C09D 5/10

[52] U.S. Cl. .................................. 106/188; 106/14.05; 106/189; 106/193 J; 106/287.16

[58] Field of Search .................... 106/188, 189, 193 J, 106/287.14, 287.16

[56] References Cited

U.S. PATENT DOCUMENTS

| | | | |
|---|---|---|---|
| 2,340,072 | 1/1944 | Medl | 106/194 |
| 2,999,025 | 9/1961 | Cox | 106/12 |
| 3,649,307 | 3/1972 | Oken | 106/14 |
| 3,652,313 | 3/1972 | Nagata et al. | 106/193 J |
| 3,730,746 | 5/1973 | Boaz | 106/287 |
| 3,767,450 | 10/1973 | Popiolek | 106/26 |
| 3,832,204 | 8/1974 | Boaz | 106/287 |
| 3,910,797 | 10/1975 | Beers | 106/287.16 |
| 3,988,160 | 10/1976 | Trexel | 106/189 |
| 4,070,200 | 1/1978 | Felten | 106/188 |
| 4,086,096 | 4/1978 | McLeod | 106/1.17 |
| 4,172,734 | 10/1979 | Takahashi | 106/287.16 |
| 4,184,880 | 1/1980 | Huber | 106/287.14 |

OTHER PUBLICATIONS

Eickhoff, *Modern Paints & Coatings*, "Wet Ground Mica", Nov. 1975, pp. 67-69.

Jones, *Pigment & Resin Tech.*, "Extenders & Zinc Rich Paints", Jan. 1972, pp. 40-43.

*Primary Examiner*—John Kight, III

*Assistant Examiner*—N. M. Nutter

*Attorney, Agent, or Firm*—Michael T. Murphy

[57] ABSTRACT

Use of ethyl hydroxy ethyl cellulose to aid in dispersion and suspension of pigment and control of application rheology in inorganic zinc-rich primers made with partially hydrolyzed ethyl silicate resins is described.

4 Claims, No Drawings

METHOD OF PRODUCING PIGMENTED SILICATE COATINGS

BACKGROUND OF INVENTION

U.S. Pat. No. 3,056,684 teaches protective paintlike coatings containing powdered zinc and partially hydrolyzed ethyl silicate. Several brands of zinc-rich coatings utilizing partially hydrolyzed ethyl silicate are commercially available. Typically, these zinc-rich coatings employ other pigments besides zinc dust to (1) lower costs, (2) enhance appearance or (3) improve performance. Because the desired pigments are not soluble in the system, they must be dispersed to their optimum particle size.

Dispersion of the pigments directly in the ethyl silicate binder would jeopardize product stability as well as require dedication of special manufacturing equipment. However, if dispersion of these pigments could be carried out in a solvent compatible with the hydrolyzed ethyl silicate these problems can be eliminated. The dispersed pigment/solvent blend could be added to the hydrolyzed ethyl silicate binder solution just prior to packaging without compromising product stability nor requiring dedication of equipment. But, it is not possible to disperse the desired pigments in the solvents because the pigments are not soluble in the solvents. A means was needed to create the shear-viscosity condition necessary for proper pigment dispersion.

SUMMARY OF THE INVENTION

The present invention describes a method of preparing pigmented partially hydrolyzed ethyl silicate binders used in protective coatings such as zinc-rich primers. The method utilizes ethyl hydroxy ethyl cellulose to aid in the dispersion and suspension of pigments in the binder solution. The addition of ethyl hydroxy ethyl cellulose to the solvent enables the pigments to be dispersed in the solvent rather than in the ethyl silicate solution, thereby preserving product stability and avoiding additional manufacturing costs incurred from dedicating equipment for manufacturing the coatings. The separate pigment/solvent blend can then be added to the partially hydrolyzed ethyl silicate solution just prior to packaging.

DETAILED DESCRIPTION OF THE INVENTION

Typical ethyl silicate based inorganic zinc-rich primers consist of two separate components which are mixed together just prior to use. Upon mixing the product will be useful for a limited period of time. Normally one of the components consists solely of zinc dust and the other component contains a mixture of pigments in a solution of hydrolyzed ethyl silicate. These pigments are present primarily to lower the cost of this otherwise relatively expensive product.

It has been found that pigmentation need not be 100% zinc dust to give equivalent corrosion protection. In fact, choice of the proper type and amount of "extender" pigments can actually improve performance. Other reasons for using these additional pigments are product appearance and hardness. For economic reasons primarily, these pigments are almost invariably included in the binder component rather than "dry blended" with the zinc dust.

The binder in this product is partially hydrolyzed ethyl silicate. It is produced by partially hydrolyzing tetraethyl orthosilicate. This hydrolysis can be "stopped" at any desired level of hydrolysis by adjustment of the amount of water used in the reaction. Typically, a range of 80–95% hydrolysis is desired for use in zinc-rich primers. The final product, however, has inherent stability limitations. Within a certain period of time a reaction process will continue making the product unusable as a coating. Certain conditions are known to accelerate this inherent instability. Among the most critical are presence of excess moisture and heat.

The extender pigments such as wet ground mica which are used in zinc-rich primers are not soluble in the solvent used in the system. (See Pigment and Resin Technology, pp. 40–43, January, 1972, and Modern Paint and Coatings, pp. 67–69, November, 1975.) Typical solvents are Cellosolve (ethylene glycol monoethyl ether) and alkanols such as ethanol and isopropanol. For optimum effectiveness, the pigments must be dispersed to their minimum particle size. This dispersion process must be carried out in typical manufacturing equipment.

Dispersion carried out directly in the partially hydrolyzed ethyl silicate binder results in the likelihood of accelerated instability of the binder due to possible moisture contamination and the heat generated during pigment dispersion due to friction. Since ethyl silicate reacts with the metal lining of typical paint manufacturing equipment, special manufacturing equipment is also necessary when dispersion is carried out in the ethyl silicate binder. Therefore, it is desirable to disperse the pigments in a solvent compatible with the ethyl silicate and not directly in the ethyl silicate. The dispersed pigment/solvent slurry can then be added to the partially hydrolyzed ethyl silicate solution just prior to packaging.

Although it is desirable to disperse the pigments in a compatible solvent rather than in the ethyl silicate, itself, it is not possible to do so effectively unless the viscosity of the solvent is increased. Dispersion in solvent alone does not allow pigment particle agglomerates to be reduced to their minimum size. Solvent in itself is simply too thin to be an effective dispersion medium. Merely adding pigments to "thicken" the solvent creates a thixotropic or "puffy" rheology which is equally ineffective for true dispersion. A means was needed to "thicken" the solvent without creating "puffiness".

Many different types of traditional rheological control agents were evaluated. Pigment type thixotropes such as Microcel T-38 and Cab-O-Sil M5 and PTG were tried out but they either lacked viscosity stability or reacted with the ethyl silicate. Castor waxes such as Crayvallac SF and Thixatrol R produced a system which was too thixotropic for effective pigment dispersion and were in themselves too heat dependent to be easily incorporated. Other thickeners such as ethyl cellulose were not soluble in the solvents. Only ethyl hydroxy ethyl cellulose provided the desirable dispersion qualities. It was soluble in the solvents and created the necessary rheology for effective pigment dispersion.

Surprisingly, it was found that the use of ethyl hydroxy ethyl cellulose produced additional desirable effects. These include:

1. The pigments are suspended so that they do not "settle out" rapidly, or if with time they do, they can easily be mixed back into solution.

2. Viscosity of the final zinc-rich primer can be controlled without the use of additional solvent.

3. Flow of the coating after application is reduced so that thicker films may be applied without the coating sagging or running. Since zinc-rich primers protect against corrosion by galvanic action, increased film thickness provides additional protection.

4. The final dried coating is smoother than a similar coating without ethyl hydroxy ethyl cellulose.

Ethyl hydroxy ethyl cellulose is available commercially in different grades rated by their effect on viscosity per unit used. When the highest grade is used, less ethyl hydroxy ethyl cellulose is needed resulting in cost reduction and less adulteration of the basic ethyl silicate system. It should be noted that other grades are equally effective but require more to be incorporated into the system. It has been found that ethyl hydroxy ethyl cellulose of the highest commercial grade affords the desired rheology when used in the amount of at least 0.4% of the final pigmented hydrolyzed ethyl silicate binder component. Usage levels of greater than 1.0% yield products too high in viscosity to be usable without appreciable thinning.

The following example is provided to illustrate the use of this invention in a pigment slurry typically used in the manufacture of zinc-rich primers utilizing partially hydrolyzed ethyl silicate binders. The pigment slurry can be added to the ethyl silicate solution at any time, preferably just before packaging. Since it is well known in the coatings art that many different solvents and pigments may be substituted or added to the ingredients of the Example, it is not intended that the scope of the invention be limited by the Example. Parts are given in parts by weight.

EXAMPLE

One part ethyl hydroxy ethyl cellulose is added to a solution of 31.7 parts Cellosolve and 26.7 parts anhydrous isopropanol. To the solution are added 17.3 parts calcined clay, 10.8 parts wet ground mica and 10.8 parts chromium oxide. Approximately 1.8 parts castor wax type thixatrope may be added to aid suspension. The slurry is then ground in a typical paint manufacturing grinder such as a high speed grinder. When the proper pigment size and dispersion is achieved the slurry may be added to the hydrolyzed ethyl silicate solution.

What is claimed is:

1. A method of manufacturing pigmented hydrolyzed ethyl silicate binders suitable for use in zinc-rich primers wherein an extender pigment suitable for use in zinc-rich primers is added to an organic solvent containing ethyl hydroxy ethyl cellulose, ground in a paint manufacturing grinder to the proper size, and added to a solution containing partially hydrolyzed ethyl silicate.

2. A method, according to claim 1, of manufacturing pigmented hydrolyzed ethyl silicate binders suitable for use in the manufacture of zinc-rich primers wherein wet ground mica is added to an organic solvent containing ethyl hydroxy ethyl cellulose, ground in a paint manufacturing grinder to the proper size, and added to a solution containing partially hydrolyzed ethyl silicate.

3. A method, according to claim 1, of manufacturing pigmented hydrolyzed ethyl silicate binders suitable for use in the manufacture of zinc-rich primers wherein wet ground mica is added to a solution of ethylene glycol monoethyl ether, isopropanol and ethyl hydroxy ethyl cellulose, ground in a paint manufacturing grinder to the proper size, and added to a solution containing 80–95% hydrolyzed ethyl silicate.

4. In a process for manufacturing pigmented hydrolyzed ethyl silicate binders suitable for use in the manufacture of zinc-rich primers, the improvement comprising grinding wet ground mica in a paint manufacturing grinder in a solvent containing ethyl hydroxy ethyl cellulose before the hydrolyzed ethyl silicate is added to the solvent solution.

* * * * *